(12) United States Patent
Etherington

(10) Patent No.: US 10,344,737 B2
(45) Date of Patent: Jul. 9, 2019

(54) WAVE ENERGY CONVERTER WITH SUBMERGED ELEMENT

(71) Applicant: AQUA POWER TECHNOLOGIES LIMITED, Cumbria (GB)

(72) Inventor: Samuel Devon Etherington, Cumbria (GB)

(73) Assignee: AQUA POWER TECHNOLOGIES LIMITED, Cumbria (GB)

(*) Notice: Subject to any disclaimer, the term of this patent is extended or adjusted under 35 U.S.C. 154(b) by 0 days.

(21) Appl. No.: 15/543,883

(22) PCT Filed: Jan. 26, 2016

(86) PCT No.: PCT/GB2016/050154
§ 371 (c)(1),
(2) Date: Jul. 14, 2017

(87) PCT Pub. No.: WO2016/120599
PCT Pub. Date: Aug. 4, 2016

(65) Prior Publication Data
US 2017/0363058 A1    Dec. 21, 2017

(30) Foreign Application Priority Data

Jan. 27, 2015 (GB) .................................. 1501356.8

(51) Int. Cl.
*F03B 13/00* (2006.01)
*F03B 13/20* (2006.01)
(Continued)

(52) U.S. Cl.
CPC .............. *F03B 13/20* (2013.01); *B63B 1/107* (2013.01); *B63B 35/44* (2013.01); *B63B 39/03* (2013.01);
(Continued)

(58) Field of Classification Search
CPC . B63B 2035/4466; B63B 35/44; B63B 1/107; F03B 13/20; F05B 2220/708
(Continued)

(56) References Cited

U.S. PATENT DOCUMENTS 1,156,355 A    10/1915  Fisher
4,210,821 A *  7/1980  Cockerell ............... F03B 13/20
                                                    290/53
(Continued)

FOREIGN PATENT DOCUMENTS

CN    102678428 A     9/2012
DE    102005003580 A1  7/2006
(Continued)

OTHER PUBLICATIONS

International Search Report and Written Opinion for International Patent Application No. PCT/GB2016/050154 dated Apr. 4, 2016 (11 Pages).

*Primary Examiner* — Julio C. Gonzalez
(74) *Attorney, Agent, or Firm* — Lando & Anastasi, LLP

(57) ABSTRACT

A wave energy converter (1) has: a buoyant structure (2) which, in use, floats on water; a generator (18); a generator drive mechanism (38) on board the buoyant structure (2), the generator drive mechanism (38) having an rotational input drive shaft (20) and a rotational output drive shaft (36); a drive member (22) operably connected to the input drive shaft (20), the drive member (22) being moveable back and forth between a first position and a second position; a biasing arrangement (23, 26) for example a buoyant block acting on the drive member; and, a submerged element 4, 4' which, in use, moves below the surface of the water out of phase with the buoyant structure (2), the drive member (22) being attached by a tether (28) to the submerged element (4). In use, when the buoyant structure (2) encounters a wave crest, the spacing between the buoyant structure (2) and the (Continued)

submerged element (4, 4') increases and the drive member (22) is pulled towards the second position by the tether (28), and, when the buoyant structure (2) encounters a wave trough, the spacing between the buoyant structure (2) and the submerged element (4, 4') decreases and the drive member (22) is urged towards the first position by the biasing arrangement (23, 26). The back and forth movement of the drive member (22) between the first and second positions causes the input drive shaft (20) to rotate and, thereby, causes the output drive shaft (36) to rotate. The submerged element (4, 4') is preferably a heave plate. The invention also comprises a heave plate for a submerged, partly submerged or floating structure.

26 Claims, 13 Drawing Sheets

(51) Int. Cl.
    *B63B 1/10*     (2006.01)
    *B63B 35/44*     (2006.01)
    *B63B 39/03*     (2006.01)
    *H02K 7/075*     (2006.01)
    *H02K 7/18*     (2006.01)

(52) U.S. Cl.
    CPC ......... *H02K 7/075* (2013.01); *H02K 7/1853* (2013.01); *B63B 2035/446* (2013.01); *B63B 2035/4453* (2013.01); *B63B 2035/4466* (2013.01); *F05B 2220/708* (2013.01); *F05B 2240/21* (2013.01); *Y02E 10/38* (2013.01)

(58) Field of Classification Search
    USPC ....... 290/42, 53; 60/498, 495, 501, 496, 502
    See application file for complete search history.

(56) References Cited

U.S. PATENT DOCUMENTS

| | | | | |
|---|---|---|---|---|
| 4,524,283 | A * | 6/1985 | Latvus | F03B 13/20 |
| | | | | 185/11 |
| 8,866,320 | B2 * | 10/2014 | Perregrini | F03D 9/10 |
| | | | | 290/42 |
| 2008/0169653 | A1 | 7/2008 | Olson | |
| 2008/0206077 | A1 * | 8/2008 | Royset | E02B 9/08 |
| | | | | 417/333 |
| 2009/0322092 | A1 * | 12/2009 | Werjefelt | F03B 13/20 |
| | | | | 290/53 |
| 2010/0038913 | A1 * | 2/2010 | Svelund | F03B 13/1815 |
| | | | | 290/53 |
| 2011/0012358 | A1 * | 1/2011 | Brewster | F03B 13/1885 |
| | | | | 290/53 |
| 2011/0042954 | A1 * | 2/2011 | Werjefelt | F03B 13/20 |
| | | | | 290/53 |
| 2011/0221199 | A1 * | 9/2011 | Boyce | F03B 13/20 |
| | | | | 290/53 |
| 2011/0258998 | A1 | 10/2011 | Straume et al. | |
| 2011/0304145 | A1 * | 12/2011 | Raisch | F03B 13/1865 |
| | | | | 290/53 |
| 2013/0199171 | A1 | 8/2013 | Brink | |
| 2013/0341927 | A1 * | 12/2013 | Murphree | F03B 13/20 |
| | | | | 290/53 |
| 2015/0260152 | A1 * | 9/2015 | Dehlsen | F03B 13/264 |
| | | | | 416/244 B |

FOREIGN PATENT DOCUMENTS

| | | |
|---|---|---|
| DE | 102010015156 A1 | 6/2011 |
| DE | 202013011989 U1 | 1/2015 |
| EP | 2343448 A1 | 7/2011 |
| GB | 9231 | 5/1911 |
| GR | 20110100683 A | 7/2013 |
| RU | 2305794 C2 | 9/2007 |
| WO | 2009098514 A2 | 8/2009 |
| WO | 2009140689 A2 | 11/2009 |
| WO | 2016120599 A1 | 8/2016 |

* cited by examiner

WAVE ENERGY CONVERTER WITH SUBMERGED ELEMENT

CROSS-REFERENCE TO RELATED APPLICATIONS

This application is a U.S. National Stage Application and claims priority under 35 U.S.C. § 371 from International Application No. PCT/GB2016/050154, filed Jan. 26, 2016, which claims priority to GB 1501356.8, filed Jan. 27, 2015, both of which are hereby incorporated herein by reference in their entirety.

This disclosure relates to wave energy converters which are machines that convert energy from waves on water into another form such as, for example, electrical energy. This disclosure in a preferred embodiment relates to a wave energy converter including a floating structure and a submerged element that is for example a heave plate. This disclosure additionally relates to a heave plate suitable for use with a submerged, partly submerged or floating structure.

BACKGROUND

In the drive to shift energy dependency away from fossil fuels and towards renewable sources, wave energy is being actively assessed. A number of wave energy converters are under test or in operation. One wave energy converter has a float and a spar that move out of phase with one another in response to waves they encounter. The relative movement between them is harnessed to drive a generator. Wave energy technology is at an early stage and there are opportunities to make further improvements.

US patent publication US2008/0169653 describes a device comprising a pivoting float and lever arm combination attached to a beam such that the float and lever arm can unfold and change orientation to the ocean surface. The float and lever arm pivot and the float can be rotated to a vertical position relative to the water surface. The lever arm is anchored, for example by attachment to a suspended rigid heavy beam or grid or directly to the ocean bottom. The suspended beam or grid is configured to reside in a stable plane submerged beneath the ocean surface. Thus, whether the lever arm of US2008/0169653 is anchored to the ocean bottom or to such a suspended rigid heavy beam or grid, the lever arm is anchored via an anchoring position that is a substantially stationary anchoring position.

SUMMARY

According to a first aspect, there is provided a wave energy converter comprising:
  a buoyant structure which, in use, floats on water;
  a generator on board the buoyant structure;
  a generator drive mechanism associated with the generator, the generator drive mechanism having a rotational input drive shaft and a rotational output drive shaft;
  a drive member operably connected to the input drive shaft, the drive member being moveable back and forth between a first position and a second position;
  a biasing arrangement acting on the drive member;
  a submerged element which, in use, moves below the surface of the water out of phase with the floating structure, the drive member being attached by a tether to the submerged element;
  wherein, in use, when the buoyant structure encounters a wave crest, the spacing between the buoyant structure and the submerged element increases and the drive member is pulled towards the second position by the tether, and, when the buoyant structure encounters a wave trough, the spacing between the buoyant structure and the submerged element decreases and the drive member is urged towards the first position by the biasing arrangement; and,
  wherein the back and forth movement of the drive member between the first and second positions causes the input drive shaft to rotate and, thereby, causes the output drive shaft to rotate.

The drive member may be an elongate member which may have one end fastened to the input drive shaft so that the elongate member is pivotably movable between the first and second positions around an axis which is, or is parallel to, the rotational axis of the drive shaft. In a possible embodiment the elongate member may for example be an elongate arm extending from a first end about which the member is pivotable around the said axis so that a second end of the elongate arm distal from the first end is movable between the first and second positions as the first end pivots around the said axis. The second end thereby describes an arcuate path between the first and second positions. The tether may be attached at or near another end of the elongate member and for example at or near the second end of the elongate arm.

The invention is distinctly characterised in that the drive member is not anchored to an anchoring point that is fixed relative to the bed of the body of water on which the buoyant structure is deployed, whether by tethering the drive member directly to the bed or by tethering the drive member to an anchor that is configured to reside in a stable plane submerged beneath the water surface. Instead, the drive member of the invention is attached by a tether to a submerged element configured such as to move in use but out of phase with the buoyant structure floating on the surface of the water. Thereby, when the buoyant structure encounters a wave crest, the spacing between the buoyant structure and the submerged element initially increases and the drive member is pulled towards the second position by the tether to cause the input drive shaft to rotate. Similarly, when the buoyant structure encounters a wave trough, the spacing between the buoyant structure and the submerged element decreases and the drive member is urged towards the first position by the biasing arrangement.

However, the submerged element is not configured to reside in a stable plane submerged beneath the surface of the body of water in which the converter is deployed. Rather, it is configured to move vertically but out of phase with the buoyant structure on the surface. In particular, it is configured to tend to move but in a less immediate, damped manner relative to the buoyant structure. The submerged element is thus preferably a hydrodynamic damper that acts with the buoyant structure to damp its response to a surface peak or trough in use.

Such hydrodynamic dampers are known, for example comprising heave plates. The submerged element may be a heave plate or similar element. Heave plates are devices which are designed to resist any tendency to pull them through water. As a consequence, in use, the heave plate moves out of phase with the buoyant structure. The heave plate modifies the mass and the hydrodynamic behaviour of the wave energy converter. The presence of the heave plate acts in particular to effect a hydrodynamic damping of the motion of the wave energy converter.

The wave energy converter is not anchored in position via the drive member, whether by tethering the drive member directly to the bed of the body of water in which the converter is deployed or by tethering the drive member to an anchor that is configured to reside in a stable plane submerged beneath the water surface. The drive member is tethered to a submerged structure such as a heave plate that is configured to move vertically. Should it be desired to anchor the wave energy converter of the invention into position, this may be done instead by mooring the buoyant structure itself to an anchoring point that is fixed relative to the bed of the body of water, for example by tethering the buoyant structure directly to the bed of the body of water via an anchor formation at the bed or by tethering the buoyant structure directly to an anchor formation that is configured to reside in a stable plane submerged beneath the water surface.

In an embodiment an anchor formation and anchor line may be provided, wherein the anchor formation is configured to seat in use at the bed of a body of water or to reside in use in a stable plane submerged beneath the surface of a body of water and wherein the anchor line attaches the anchor to the buoyant structure.

The anchor line may attach the buoyant structure directly to the anchor formation and optionally thereby to the bed of a body of water.

In a possible arrangement a plurality of anchor formations may be provided. For example each anchor formation may serve to anchor the buoyant structure via a corresponding anchor line. In a possible arrangement a plural array of radially positioned gravity anchor formations may be provided to which the buoyant structure is tethered via a catenary anchor line system.

The tether may comprise a rigid section at an end attached to the drive member. Having a flexible section to the tether near the drive member may risk the tether becoming tangled with or wrapped around the drive member. The rigid section avoids this.

The buoyant structure is configured, in use, to float on the surface of a body of water. The submerged element is configured, in use, to deploy below the surface of the water generally below the buoyant structure when the two structures are at rest. In use as the buoyant structure encounters a wave it tends generally to move up and down relative to its at rest position. The submerged element connected via the tether is configured to respond in a damped manner and thus to move correspondingly up and down relative to its at rest position but out of phase with the floating buoyant structure.

In consequence herein, features of shape or configuration or relative position of components of the converter, and especially of the buoyant structure and submerged element, may be described with reference to this at rest position and reciprocating general up and down motion but these should be seen as for convenience only and not implying a limitation to a specific mode of use.

The buoyant structure is preferably shaped to define a stable default upright configuration. The buoyant structure is preferably shaped to be self-righting to such stable default upright configuration.

The buoyant structure preferably has a base that is rotationally symmetrical about a vertical axis. The buoyant structure preferably has a base that is convex. The buoyant structure preferably has a base that is generally conical, which term encompasses both circular and polyhedral structures.

The buoyant structure may comprise material less dense than water. Additionally or alternatively the buoyant structure may comprise a hollow walled structure defining one or more cells for example being gas filled cells.

The buoyant structure may comprise at least one ballast tank which may be used to adjust the buoyancy of the buoyant structure. Although it is feasible to have only one ballast tank, in reality, a number of ballast tanks is preferable for stability. The buoyancy of the buoyant structure may be reduced by filling the or each ballast tank with water. In the event of multiple ballast tanks, it is preferable to fill them evenly at the same time. It may be desirable to adjust the buoyancy of the buoyant structure according to the water conditions. If waves are quite high, for example, it may be desirable to reduce buoyancy. In rough conditions, it may be desirable to partially submerge or submerge the buoyant structure in order to protect it.

The drive member is provided with a biasing arrangement arranged to act on the drive member to tend to urge the drive member towards the first position which thus defines a default, unloaded position. In use as the buoyant structure floating on the water surface encounters a wave crest, the spacing between the buoyant structure and the submerged element increases and the drive member is pulled towards the second position by the tension thereby produced in the tether between the buoyant structure and the submerged element as the buoyant structure moves more immediately than and out of phase with the submerged element and the spacing between the buoyant structure and the submerged element increases. As this tension in the tether reduces, for example when the buoyant structure encounters a wave trough and the spacing between the buoyant structure and the submerged element decreases, the drive member is urged back towards the default first position by the biasing arrangement.

The biasing arrangement may comprise a spring or any like means suitable for exerting a bias force on the drive member. The spring may be a coil spring, a compression spring, an extension spring or another type of spring.

The drive member is thus for example spring biased, but other biasing mechanisms, such as hydraulic mechanisms, electrical and electromechanical mechanisms, buoyant mechanisms and the like, might also be considered.

For example, additionally or alternatively to a spring the biasing arrangement may comprise a buoyant formation and oriented in such configuration that its buoyancy tends to urge the drive member back towards the default first position. In a possible arrangement the buoyant formation is mechanically fixed to or integrally formed with the drive member.

In a possible arrangement the drive member comprises an elongate member such as an elongate arm and the buoyant formation comprises a buoyant block mechanically fixed to or integrally formed with the elongate member in such configuration as to tend to urge the elongate member towards the default first position when the buoyant structure is in its normal orientation. Typically, the buoyant block is thus mechanically fixed to or integrally formed with the elongate member to tend to urge it upwards as the buoyant structure is in a default upright orientation, and this direction corresponds to a tendency to urge the elongate member towards the first position.

In a possible arrangement the drive member comprises an elongate member having one end fastened to the input drive shaft so that the elongate member is pivotably movable between the first and second positions around an axis which is, or is parallel to, the rotational axis of the drive shaft. The drive member is for example an elongate arm extending from a first end about which the member is pivotable around the said axis so that a second end of the elongate arm distal from the first is movable between the first and second positions as the first end pivots around the said axis. The second end thereby describes an arcuate path between the first and second positions. The buoyant block conveniently comprises a structure with a surface defining an arcuate corresponding to all or part of the sector defined by the said arcuate path.

The buoyant biasing formation may comprise material less dense than water. Additionally or alternatively the buoyant biasing formation may comprise a hollow walled structure defining one or more cells for example being gas filled cells.

In accordance with the invention a generator on board the buoyant structure is provided with at least one drive member. In a preferred case a plurality of drive members are provided. For example plural drive members are carried on the buoyant structure for example arrayed around a lower perimeter portion thereof. For example plural elongate arms are so provided.

Each drive member is operably connected to the input drive shaft of a generator drive mechanism having a rotational input drive shaft and a rotational output drive shaft. Plural drive members may be operably connected to a common generator drive mechanism. Alternatively, each drive member may be operably connected to a respective generator drive mechanism.

Each drive member is attached by a tether to the submerged element.

In a preferred embodiment, a single buoyant structure is provided with a plurality of drive members, for example in a plural array around a lower perimeter portion thereof, a single submerged element is provided, and each drive member is attached by a tether to the common single submerged element.

Each drive member may be provided with a discrete tether to connect the drive member directly to the submerged element. Alternatively at least some of the tethers may be joined to form a single tether which is attached to the submerged element. For example pairs of drive members may be connected via corresponding tethers that join to form a single tether which is attached to the submerged element.

Each tether may comprise a single elongate tether line or multiple such lines.

The converter of the invention comprises at least one generator drive mechanism associated with a generator, the generator drive mechanism having a rotational input drive shaft and a rotational output drive shaft. The drive mechanism may comprise at least one clutch so that only rotation of the input drive shaft in one direction is transmitted to the output drive shaft. Rotation of the input drive shaft in both directions may be transmitted to the output drive shaft, but may be less efficient. The drive mechanism may also comprise a gearing arrangement or chain drive or belt drive and/or a flywheel.

Alternatively, the drive mechanism may comprise a hydraulic drive.

Preferably, the converter comprises multiple generators, each generator having an associated drive mechanism, each drive mechanism having an input rotational drive shaft and an output rotational drive shaft, wherein a drive member is operably connected to each input drive shaft and each drive member is attached to the submerged element by a tether. In a possible embodiment, for example, the converter comprises three to six generators and for example three or four generators. Where the converter comprises multiple generators and/or multiple drive members these are conveniently generally evenly disposed and for example circumferentially arrayed around a base portion of the buoyant structure.

The converter may comprise a mooring arrangement for mooring the buoyant structure in position and to minimise the tendency of the buoyant structure to rotate. This may be done by mooring the buoyant structure to an anchoring point that is fixed relative to the bed of a body of water in which the converter is deployed, for example by tethering the buoyant structure directly to the bed of the body of water via an anchor formation at the bed or by tethering the buoyant structure directly to an anchor formation that is configured to reside in a stable plane submerged beneath the water surface. The mooring arrangement may comprise one or more mooring or anchor lines. The mooring system allows for tidal height range and movement between the buoy and cable/mooring line.

A power take-off cable for carrying electricity away from the generator(s) may exit the buoyant structure. Conveniently, the power take-off cable may be incorporated with the mooring arrangement, for example being coupled to a mooring line such as to provide support from line weight and current forces.

The buoyant structure may comprise an access hatch which provides access into the buoyant structure for maintenance, adjustments, repairs etc. The buoyant structure may be any suitable shape.

The converter may further comprise at least one additional generating system such as a solar array or wind turbine. In addition to wave energy, the converter may convert solar and/or wind energy.

The converter of the first aspect of the invention comprises a buoyant structure which, in use, floats on water; and a submerged element which, in use, moves below the surface of the water out of phase with the floating structure. The submerged element is configured to respond to movement of the buoyant structure as it moves with the surface but in a damped manner relative to the buoyant structure and thus to move correspondingly up and down out of phase with the floating buoyant structure.

The submerged element is thus preferably a hydrodynamic damper that acts with the buoyant structure to damp its response to a surface peak or trough in use. The submerged element may be a heave plate or similar element.

The submerged element, for example being a heave plate, preferably defines a respective first and a respective second hydrodynamic surface respectively configured to damp the motion of the submerged structure in respective opposite first and second directions, being in practice upwardly and downwardly through the water in which it is submerged, where reference to upward and downward motion will be understood to be relative to a notional neutral at rest position.

In a preferred embodiment, the first, upper hydrodynamic surface is generally concave. In a preferred embodiment, the second, lower hydrodynamic surface is generally convex. In this context, references to generally concave and generally convex surfaces will be understood by the skilled person to encompass generally concave and generally convex curved surfaces, generally concave and generally convex surfaces comprising planar portions, and combinations thereof. Concave and convex surfaces may for example be conical which term when used herein encompasses both circular and polyhedral structures.

In a particularly preferred embodiment, the upper and lower surfaces are correspondingly and similarly concave and convex. For example, the upper and lower surfaces are formed by opposed surfaces of a suitably shaped plate formation, which plate formation may be a monolithic plate but is more preferably composed of plural curved and/or planar plate elements.

Conveniently, the submerged element, for example being a heave plate, and in the preferred embodiment the plate formation comprising the submerged element for example being a heave plate, has a rotational symmetry. For example, the submerged element and in the preferred embodiment in particular the plate formation thereof comprises a generally conical formation with a downwardly directed apex, which term when used herein encompasses both circular and polyhedral conical structures.

For example, the submerged element and in the preferred embodiment in particular the plate formation thereof has a generally right circular conical shape or a regular polyhedral pyramidal shape with a downwardly directed apex.

In a preferred arrangement the plate formation comprises a plurality of plate elements of congruent shape, that together define a complete plate formation, and for example that each extend from a perimeter of the submerged element to the centre, for example being the apex as above described.

In a preferred embodiment, the submerged structure for example being a heave plate, defines one or more selectively closable apertured portions operable to vary the hydrodynamic resistance to the movement of the submerged structure through the water. Each such apertured portion is for example provided with an openable closure operable between a first, open position whereat flow of water through the aperture is freely permitted and a second, closed position whereat flow of water through the aperture is substantially occluded or prevented.

In a particular preferred case, the apertured portions and corresponding closures are respectively configured such that the behaviour of the submerged structure as it moves hydrodynamically in first and second opposite directions, in use upwardly and downwardly, may be set to be different.

In a preferred embodiment the submerged structure comprises a plate formation as above described. Most preferably however, the plate formation is not a single monolithic plate structure but comprises a plurality of curved and/or planar plate elements or panels. In a particularly preferred embodiment, at least some of the said panels are configured as selectively openable closure flaps, which serve in an open position to open an apertured portion within the plate formation and serve in a closed position at least substantially to occlude the said apertured portion in the plate formation.

Panels so adapted may for example be hinged to open under hydrodynamic pressure in one or other intended upward or downward motion direction of the submerged element, via a hinged mechanism which is for example biased to a closed position so that the closure is adapted to open under a predetermined hydrodynamic pressure.

Plural such openable closure flaps may be provided, preferably radially arrayed about a rotationally symmetrical submerged structure.

Openable closure flaps may be provided for example adapted whereby in a first opening mode flaps are hinged to move to an open position under a hydrodynamic pressure acting in a first direction as the submerged element tends to move in an opposite direction. For example the flaps are hinged to move under a hydrodynamic pressure acting downwardly as the submerged element moves upwardly, in particular configured thereby to allow rapid upward movement of the submerged structure. For example, the flaps in this mode of operation are adapted to burst open at a relatively low resistance to allow rapid upward movement.

Openable closure flaps may be provided for example adapted whereby in a second opening mode flaps are hinged to move to an open position under a hydrodynamic pressure acting in a second direction as the submerged element tends to move in an opposite direction. For example the flaps are hinged to move under a hydrodynamic pressure acting upwardly as the submerged element moves downwardly for example configured thereby to limit the damping effect of the submerged element on downward motion and allow limited but less rapid movement in this direction.

Different sets of flaps may be provided respectively adapted to the first and second opening modes. Alternatively, by suitable configuration of hinges, a set of openable closures may be configured to open in either of the said first and second opening modes dependent upon the direction of motion of the submerged element in use.

Such openable closure flaps may be biased to a closed position. The biasing force determines the hydrodynamic pressure required to urge open the said flaps. Respective hinges may be configured whereby a different biasing force is applied in respect of movement respectively in the first and second opening mode. In this way, the flaps configured to open in first and second opening modes at respectively differing hydrodynamic pressures. The closure flaps are for example spring biased, but other biasing mechanisms, such as hydraulic mechanisms, electrical and electromechanical mechanisms, buoyant mechanisms and the like, might also be considered.

In a particularly preferred embodiment, by suitable arrangement of hinges, flaps are provided within the submerged structure which are adapted to open in either direction at different pre-set hydrodynamic pressures.

In a convenient embodiment, the submerged element comprises a perimeter frame structure defining a circular or regular polygonal perimeter, from which a plurality of generally triangular articulating closure flaps extend together to define a complete plate formation. In particular, such a plate formation defines a concave upper and convex lower surface with the respective triangular flaps meeting at an apex.

In a possible embodiment, each triangular flap is hinged by a first hinge arrangement to deploy in a first direction from a closed position to a first open position when hydrodynamic pressure acts in a first direction, and via a second hinge arrangement to deploy in a second direction from a closed position to a second open position when hydrodynamic pressure acts in a second direction, For example, in a possible embodiment, each triangular flap is hingedly mounted to a corresponding portion of a perimeter frame to be deployable in a first direction to a first open position under the action of hydrodynamic pressure in a first direction. Such a first direction for example corresponds to a flap opening downwardly in rapid manner under a downward hydrodynamic pressure.

Each flap is provided with a second hinge arrangement in which first and second portions of the said flaps are hingedly articulated together by a hinge extending radially whereby the first and second portions of the said flaps foldable under the action of hydrodynamic pressure in a second direction. Such a second hinge arrangement is for example actuated to deploy to an upward open position under hydrodynamic pressure acting in an upward direction in use.

Thus, a single arrangement of plate structures is admirably flexible in being deployable between a closed position in which the plate formation substantially occludes flow, and respective alternative first and second open positions which may be provided with different closing biases to provide for different hydrodynamic behaviour for movement in respective first and second directions, corresponding to upward and downward motion in the water when the submerged element is deployed in use.

In accordance with the preferred embodiment above described, an embodiment of heave plate is presented that is particularly suited to serving as a submerged element in accordance with a first aspect of the invention.

As the skilled person will appreciate, heave plates are known for a wide range of applications where it might be desirable to modify the hydrodynamic behaviour of a submerged, partly submerged or floating structure. The embodiment of heave plate presented hereinabove is particularly suited to but not limited to a function as a submerged element in accordance with a first aspect of the invention. It might be considered for application in any scenario where a heave plate might be used to modify the hydrodynamic behaviour of a submerged, partly submerged or floating structure.

Accordingly, in accordance with a second aspect of the invention, a heave plate is presented as hereinbefore described.

In accordance with a more complete third aspect of the invention, a hydrodynamically modified structural assembly is provided comprising a primary structural module which comprises in use a submerged, partly submerged or floating structure, tethered to a submerged structure comprising a heave plate in accordance with a second aspect of the invention.

According to a further aspect of the invention, there is provided a method of making a converter according to the first aspect.

According to a further aspect of the invention, there is provided using the converter according to the first aspect to convert wave energy to electrical energy. Electrical energy may then be distributed from the converter to a remote site for use or used directly by apparatus associated with and for example carried on the buoyant structure.

According to a further aspect of the invention, there is provided using the converter according to the first aspect to utilise wave energy directly as a source of electrical, electromechanical or mechanical power for an apparatus associated with and for example carried on the buoyant structure. For example the wave energy may be used in operation of a desalination system.

According to a further aspect of the invention, there is provided using the heave plate according to the second aspect to modify the hydrodynamic behaviour of a submerged, partly submerged or floating structure.

DESCRIPTION OF THE DRAWINGS

Embodiments of the disclosure will now be described, by way of example only, with reference to the following drawings, in which.

DETAILED DESCRIPTION

Figure 1:
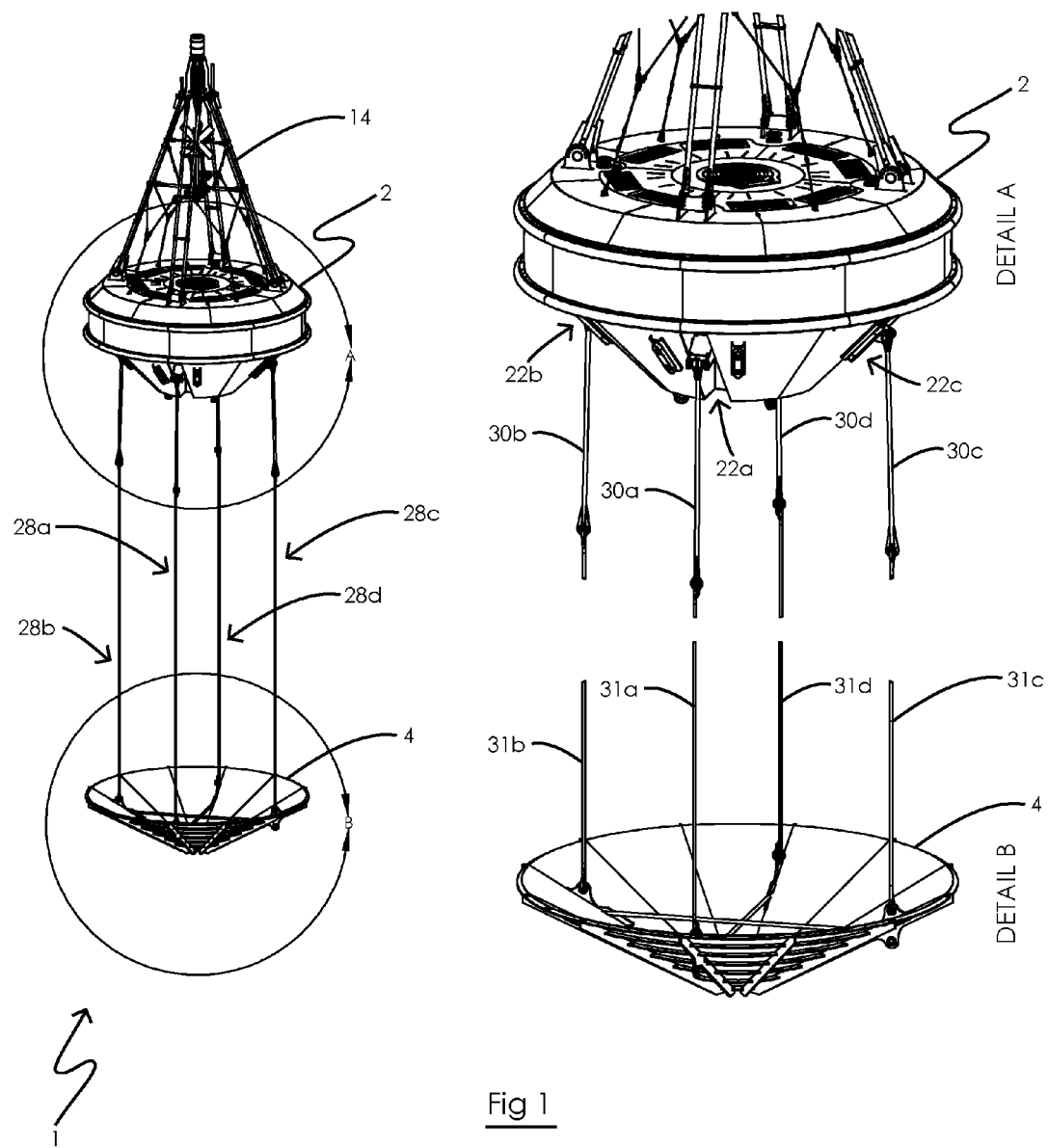
FIG. 1 is a perspective view, including exploded detail, of one embodiment of a wave energy converter.

With reference to FIG. 1, an embodiment of a wave energy converter indicated generally at 1 comprises a buoyant structure 2, and a submerged element in the form of a heave plate 4. The converter 1 is shown in the in-use configuration with the buoyant structure floating on sea (not shown), and the heave plate 4 below the surface.

The buoyant structure 2 is tethered to the heave plate 4 in a manner discussed in greater detail below. As a result, the heave plate is enabled to move in a manner associated with but damped relative to the buoyant structure such as to move in use but out of phase with the buoyant structure as the buoyant structure moves up and down with the surface of the water.

Figure 2:
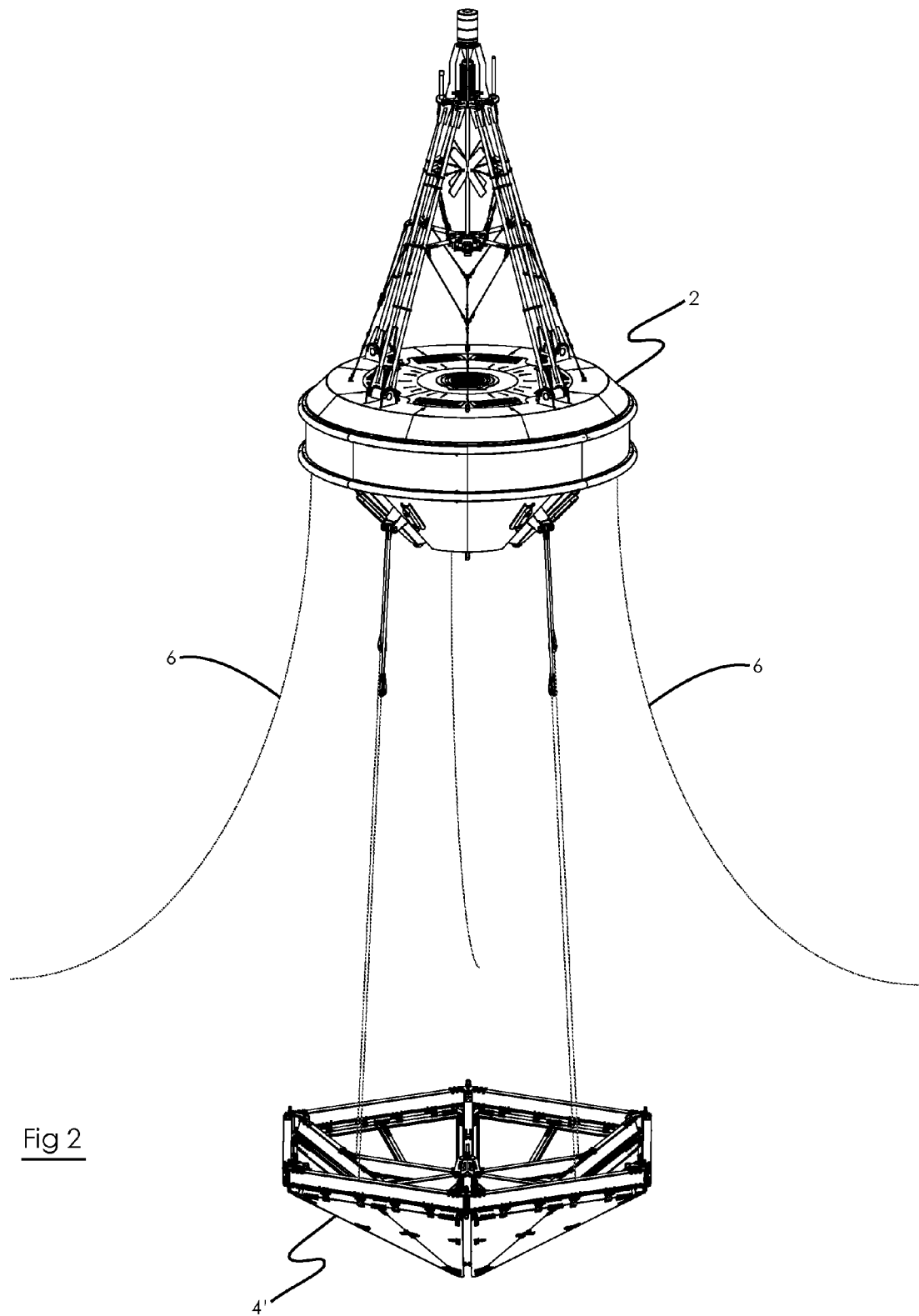
FIG. 2 is a perspective view of an embodiment of a wave energy converter with a mooring arrangement illustrated.

FIG. 2 shows a generally equivalent wave energy converter with an illustration of a possible mooring arrangement. Minor variants are shown in the heave plate 4' and in the tethering arrangement between the buoyant structure 2 and the heave plate 4' as discussed in greater detail below. Otherwise like numerals are used to refer to like components.

FIG. 2 shows a mooring arrangement whereby the buoyant structure 2 is moored in position. This may be done by mooring the buoyant structure to an anchoring point that is fixed relative to the bed of a body of water in which the converter is deployed, for example by tethering the buoyant structure directly to the bed of the body of water via an anchor formation at the bed or by tethering the buoyant structure directly to an anchor formation that is configured to reside in a stable plane submerged beneath the water surface.

The mooring arrangement in the embodiment comprises an array of three radially positioned anchor lines 6. Each anchor line 6 is conveniently anchored to a suitably positioned gravity anchor. The lines thus form a catenary anchor line system.

A generator is carried on board the buoyant structure having a generator drive mechanism with a rotational input drive shaft and a rotational output drive shaft and a drive member operably connected to the input drive shaft, the drive member being moveable back and forth between a first position and a second position to drive the generator. FIGS. 3 to 9 illustrate aspects of the generator drive mechanism and associated components.

With further reference to FIGS. 3 to 6 in particular, the structure 2 comprises a body 7 which has an upper, platform part 8, which is generally cylindrically shaped, and a lower, hull part 10, which is generally frusto-conically shaped. In general, the platform part 8 sits mid-water and the hull part 10 is generally below the waterline, although the buoyancy of the structure 2 may be altered by filling or emptying ballast tanks (not shown) within the structure 2 with water. On top of the platform part 8 there is a deck 12. Mounted on the deck 12 is rigging 14 which may support warning lights (not shown) or signs (not shown). In the centre of the deck 12 there is an access hatch 16 which provides access into the structure 2.

Figure 5:
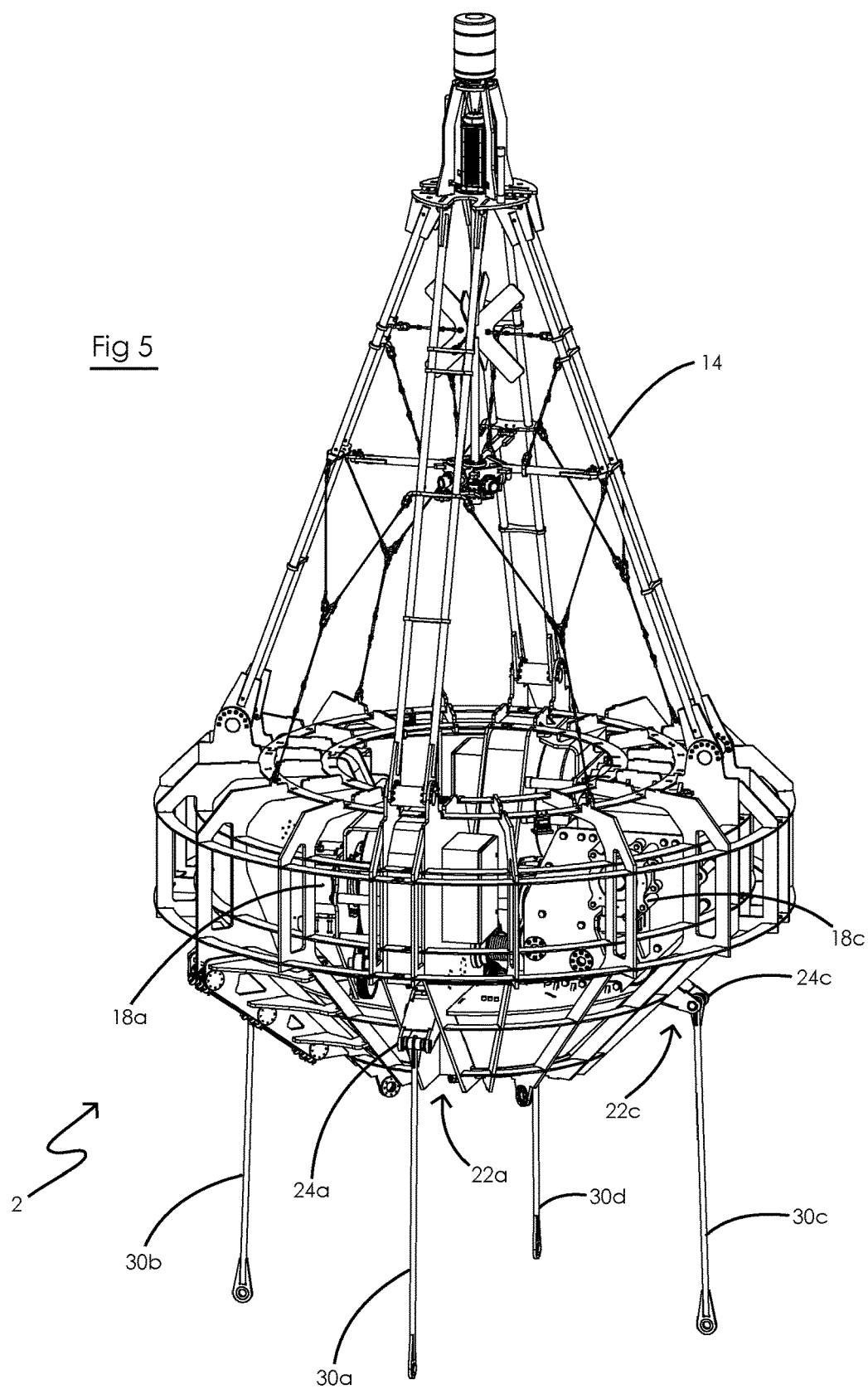
FIG. 5 is the same perspective view as FIG. 3 except that the buoyant structure is shown without an outer skin so that its interior is visible.
Figure 8:
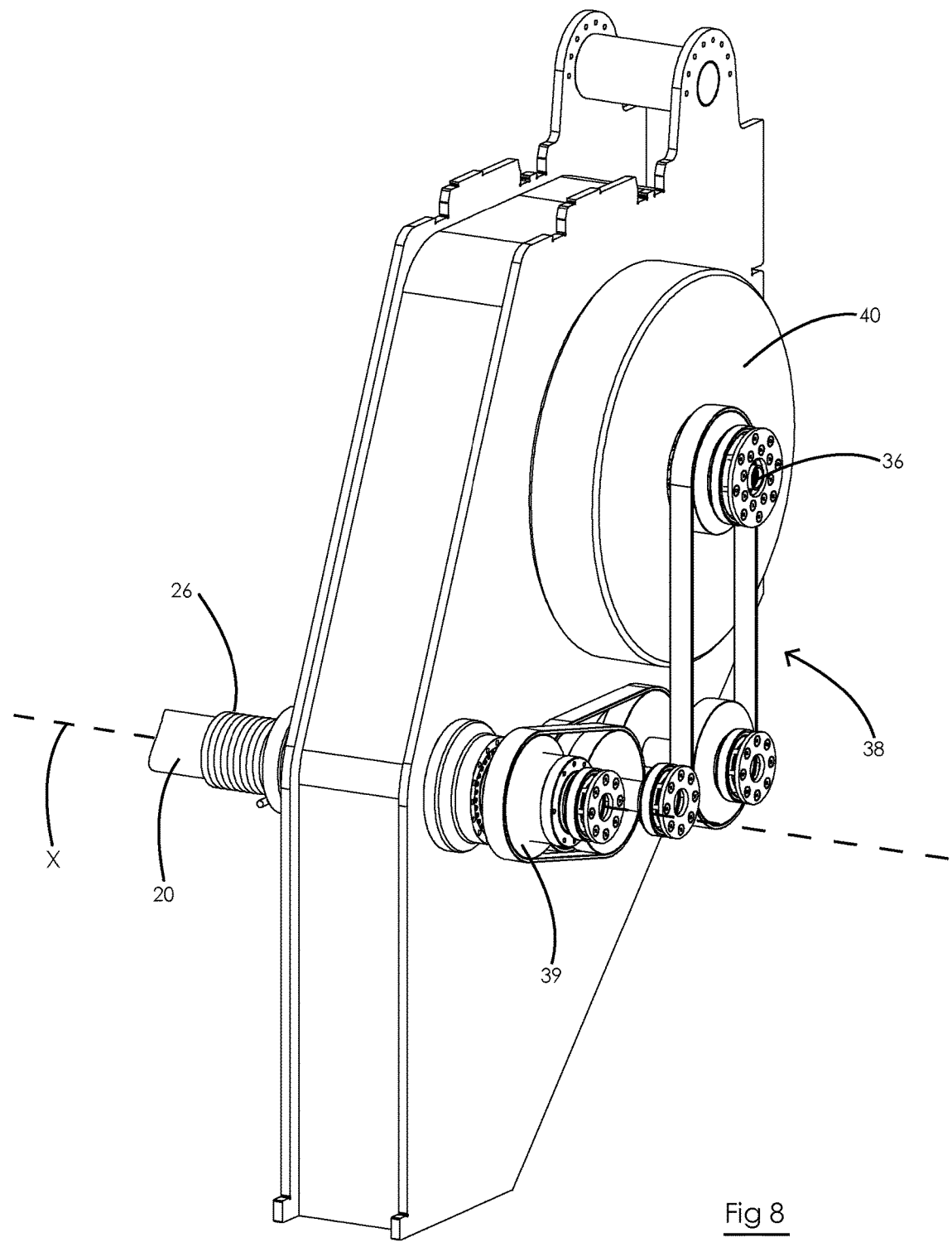
FIG. 8 is a perspective view of a suitable generator drive mechanism.
Figure 9:
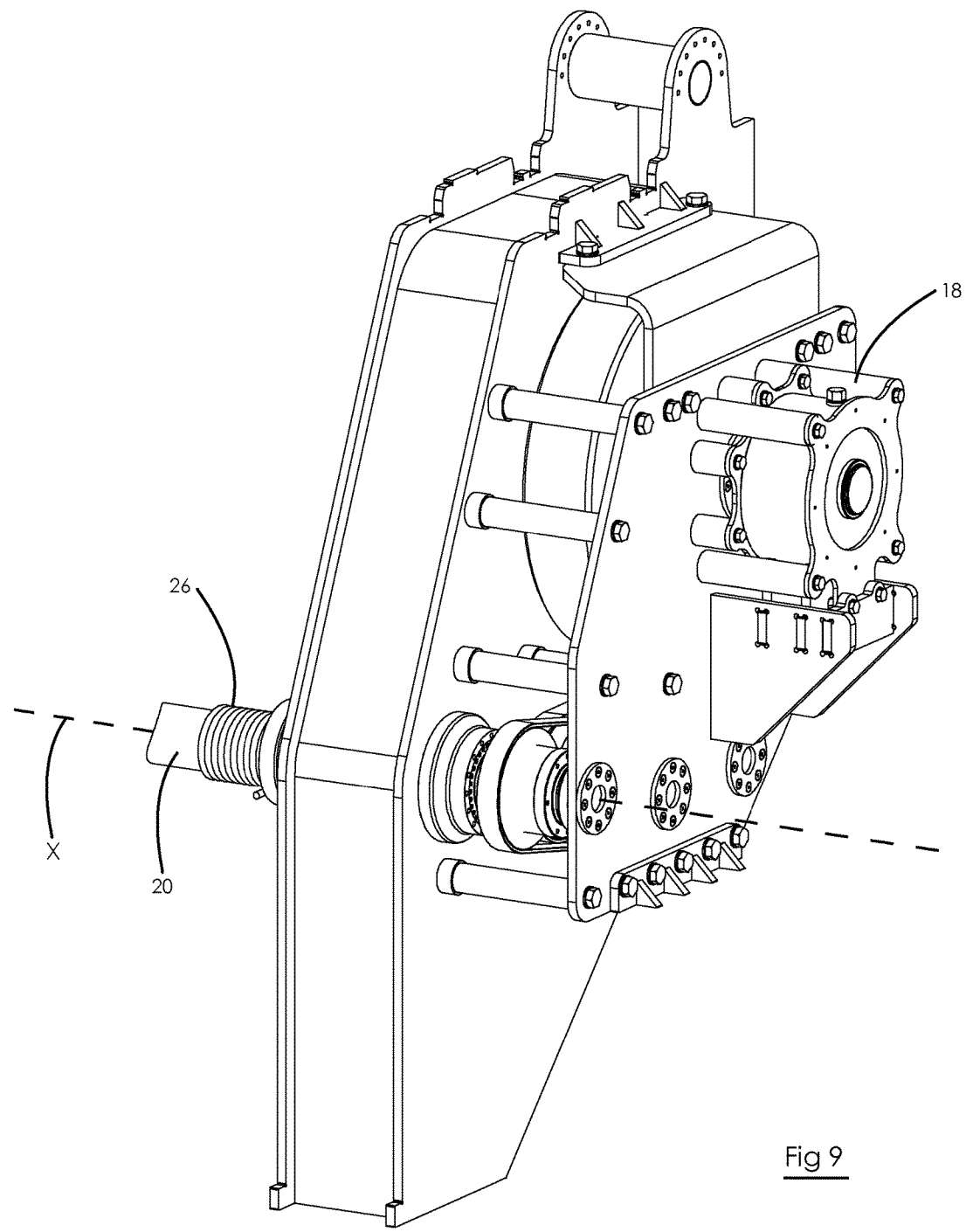
FIG. 9 is a perspective view of the generator drive mechanism shown in FIG. 8, together with the associated generator.

Most clearly shown with reference to FIGS. 5, 8 and 9, housed within the structure 2 of the embodiment are four generators 18. This is an example only. The same general principles may be applied to other numbers of generators. Each generator 18 has a rotational input drive shaft 20. Each input drive shaft 20 has a drive member 22 operably connected to it. In the embodiment there are thus four drive members carried on and circumferentially arrayed about a lower portion of the structure 2, the drive members being referenced generally as 22 and where the four are individually distinguished respectively as 22a, 22b, 22c, 22d.

Figure 3:
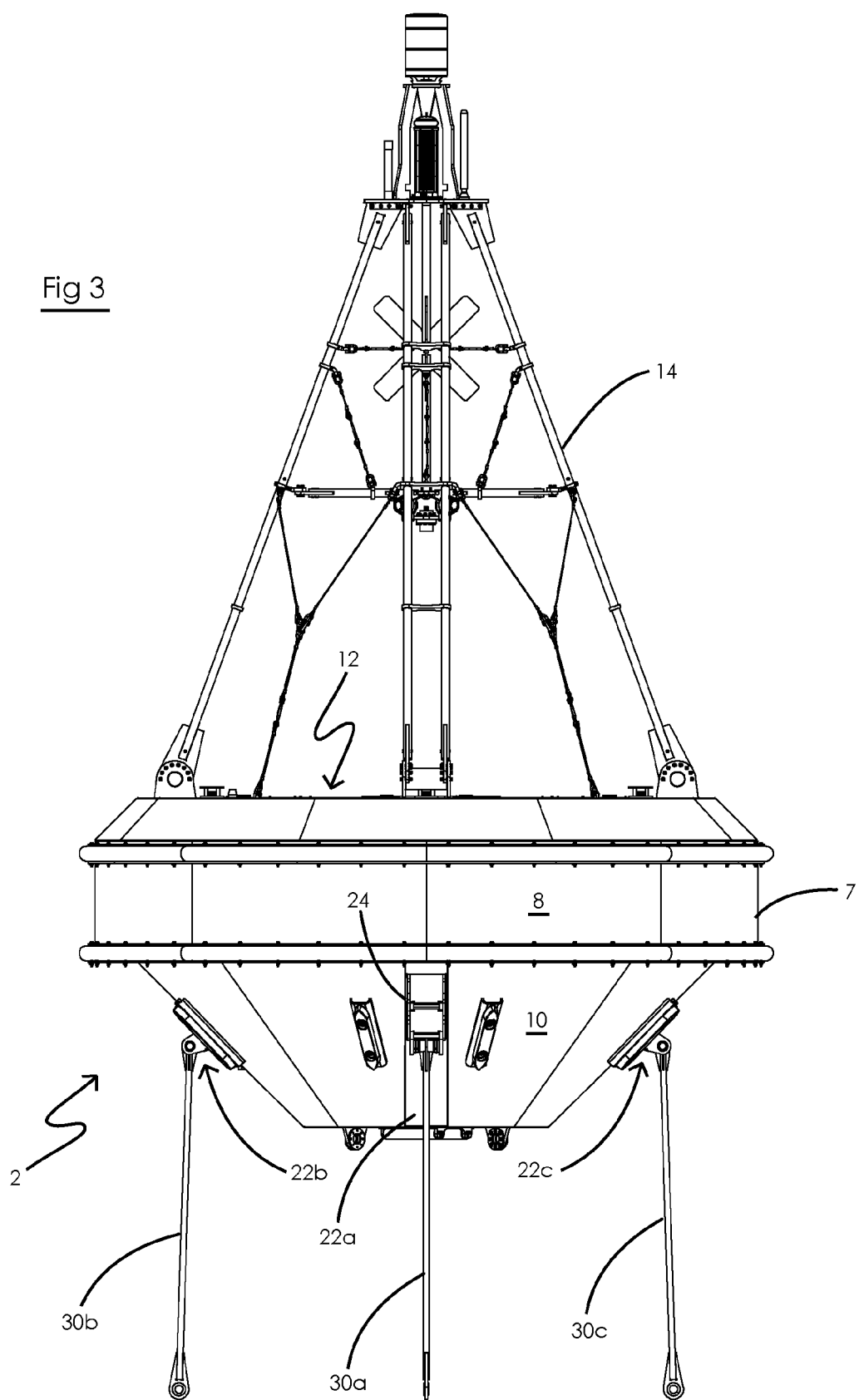
FIG. 3 is a side view of the buoyant structure and associated elements of the converter shown in FIG. 1.
Figure 4:
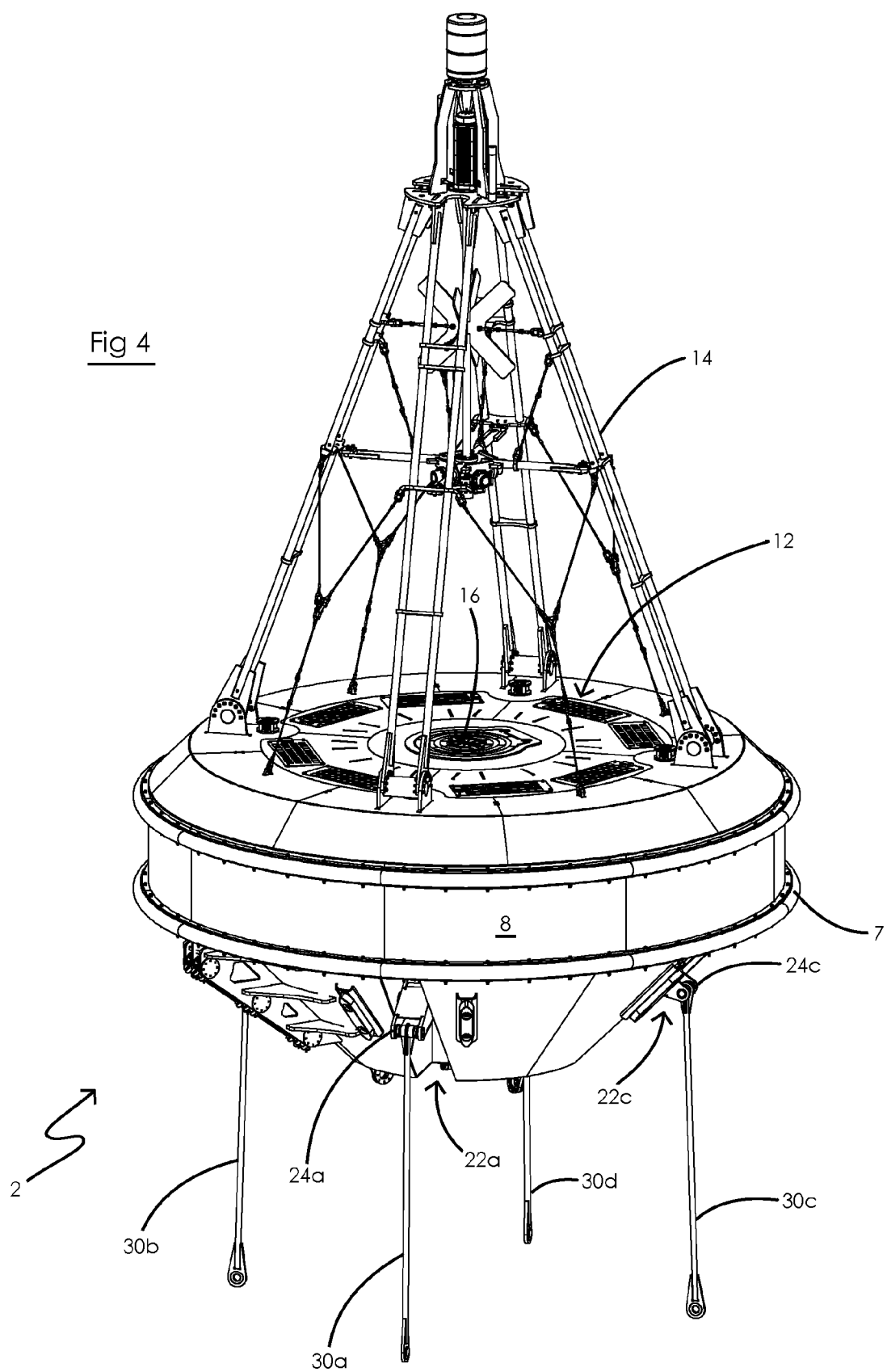
FIG. 4 is a perspective view of the buoyant structure and associated elements shown in FIG. 1.

Each drive member 22 is elongate and has a first, proximal end (not visible in the figures) fastened to its associated input drive shaft 20. Each drive member 22 extends through the body 7 so that its other, distal end 24 is outside of the hull part 10, underwater. Each drive member 22 is fastened to its associated input drive shaft 20 so as to be pivotably movable around a rotational axis X which is, or is parallel to, the rotational axis of its associated input drive shaft 20. Each drive member 22 is pivotably moveable back and forth between two extreme positions: a first, stowed position; and, a second, extended position. Each input drive shaft 20 and its associated drive member 22 are so arranged that, in the first, stowed position, each drive member 22 is generally flush with the hull part 10 (as shown in FIGS. 1 to 3).

A biasing arrangement, in the form of a coil spring 26 around each input drive shaft 20, acts on its associated drive member 22 so as to urge that drive member 22 towards the stowed position. Also, each input drive shaft 20 and its associated drive member 22 are so arranged that pulling down on the distal end 24 of each drive member 22 causes it to pivotably move around the rotational axis X of the associated input drive shaft 20 towards the extended position. In the extended position, each drive member 22 protrudes outwards, away from the hull part 10. Because each drive member 22 is fastened to its associated input drive shaft 20, movement of each drive member 22 back and forth between the stowed position and the extended position causes the associated input drive shaft 20 to rotate back and forth. In other words, the drive shaft 20 oscillates back and forth.

Figure 6:
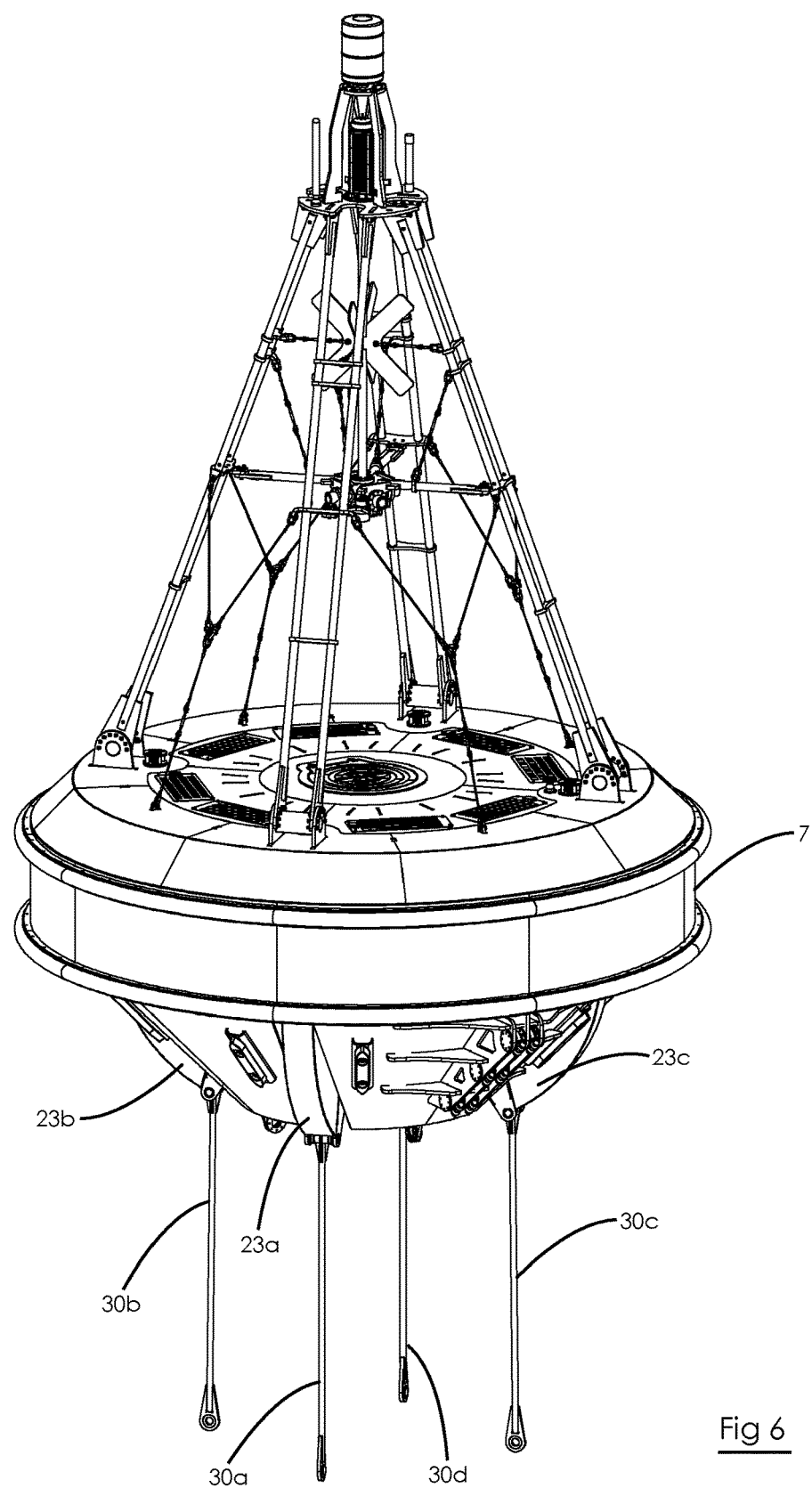
FIG. 6 is a side view of a variant arrangement of buoyant structure and associated elements for the converter shown in FIG. 1 including a buoyant block biasing system.
Figure 7:
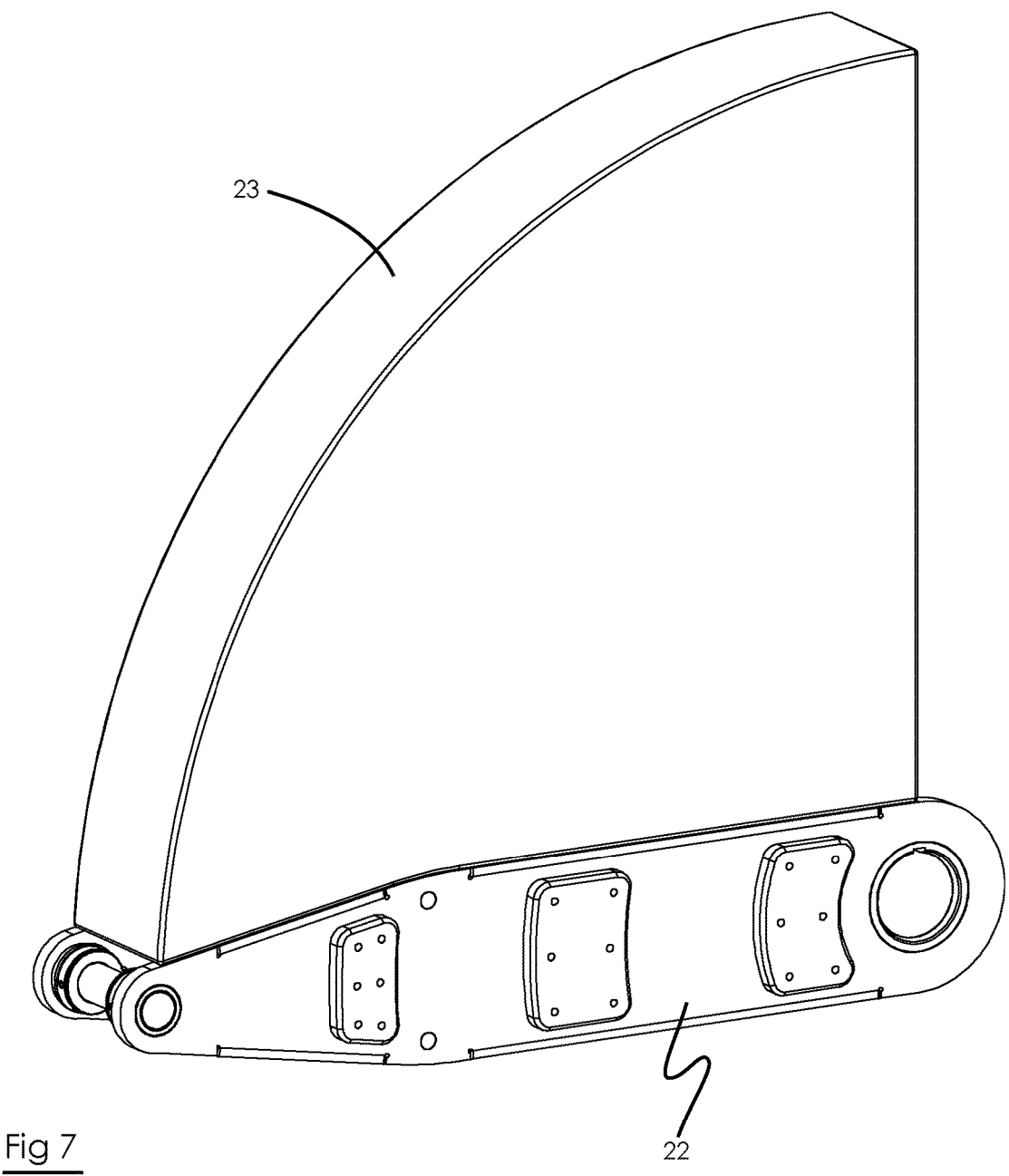
FIG. 7 is a perspective view of the buoyant block biasing system of FIG. 6.

FIGS. 6 and 7 show an alternative biasing system. Each drive member (not specifically visible in FIG. 6) is mechanically connected to a quarter circle buoyant block 23 (where individually distinguished, respectively as 23a, 23b, 23c, 23d). As in the first variant arrangement, each drive member 22 is mounted to be pivotably movable around a rotational axis X which is, or is parallel to, the rotational axis of its associated input drive shaft 20 so as to be moveable back and forth between two extreme positions: a first, stowed position; and, a second, extended position. The arrangement of drive member and buoyant block is so orientated that the buoyancy of the block tends to bias the drive member to its stowed position.

Each drive member 22 is attached to the heave plate 4, 4' by a tether 28 (where individually distinguished, respectively as 28a, 28b, 28c, 28d). Each tether 28 comprises a rigid section 30 at the end near the associated drive member 22 and a flexible section 31 between the rigid section 30 and the heave plate 4, 4'. The rigid section 30 prevents each tether 28 from tangling around its associated drive member 22. In the embodiments each rigid section 30a, 30b, 30c, 30d is connected via a respective discrete flexible section 31a, 31b, 31c, 31d to the heave plate. Other arrangements could be considered, for example where a combined tether connects to two or more rigid sections.

Heave plates are well known, but, in short, they are devices which are designed to resist any tendency to pull them through water. In this particular embodiment, the heave plate 4, 4' is designed so as to resist any tendency to pull it upwards. The heave plate 4, 4' hangs underwater, suspended from the structure 2 by the tethers 28. The relationship between the weight of the heave plate 4, 4' and the spring force of each coil spring 26 or the buoyancy of each buoyant block 23 is such that, in steady state conditions, each drive member 22 remains in the stowed position. In the event that the structure 2 encounters a wave crest (not shown), the structure 2 rises upwards with the water level. The heave plate 4, 4' is less inclined to rise with the wave crest and opposes the tendency of the structure 2 to pull the heave plate 4, 4' upwards, thereby dragging on the structure 2. Although the heave plate responds by moving upwards, it does so much more slowly, out of phase with the structure 2. As a consequence, the spacing between the structure 2 and the heave plate 4, 4' increases and the heave plate 4, 4' pulls down on each drive member 22 through each associated tether 28. This causes each drive member 22 to move towards its extended position thereby rotating its associated input drive shaft 20. Then, whilst each drive member 22 is moving to its extended position, the structure 2 will encounter a wave trough (not shown) that follows the wave crest. The structure 2 falls down with the wave trough. Because of the responsiveness of the structure 2 as against the inertia of the heave plate 4, 4', the spacing between the structure 2 and the heave plate 4, 4' decreases and each coil spring 26 or buoyant block 23 acts on its associated drive member 22 so as to urge the associated drive member 22 to its stowed position. In so doing, each drive member 22 rotates its associated input drive shaft 20, albeit in the direction opposite to when the structure encountered a wave crest. Whilst the converter 1 is repeatedly going through this sequence, as the structure 2 encounters wave after wave, each drive member 22 repeatedly moves back and forth between its stowed and extended positions, thereby keeping its associated input drive shaft rotating back and forth.

As will be appreciated, the nature of the sea is such that the drive members 22 will not always move in unison. The direction and shape of the waves and the pitching and rolling of the structure 2, for example, will mean that the drive members 22 may operate out of phase with one another.

The input drive shaft 20 is one element of a drive mechanism 38 which also comprises an output drive shaft 36 to each generator 18. An arrangement of pulleys and belts within the drive mechanism 38 provides transmission between each input drive shaft 20 and each output drive shaft 36. Hence, rotation of each input drive shaft 20 thereby causes rotation of the associated output drive shaft 36 which, in turn, drives the associated generator 18 to generate electricity. The relative size of the pulleys provides a gearing ratio between the input drive shaft 20 and the output drive shaft 36. The drive mechanism 38 includes at least one clutch 39 such that only rotation of the input drive shaft 20 in one direction is transmitted to the output drive shaft 36. The drive mechanism 38 optionally also includes a flywheel 40 to provide inertia. However in an alternative design the flywheel may be dispensed with and an appropriate configuration of stator used within the generator that has an inertia allowing it to perform an equivalent function. Additionally or alternatively any other combination of electronic and mechanical systems may be used to store energy and maintain inertia.

Electricity generated by each generator 18 is carried from the converter 1 by a power take-off cable (not shown) which exits the structure 2 with the downwind mooring line.

FIGS. 10 to 15 illustrate an embodiment of heave plate suitable for use in the converter system of the invention, illustrating the heave plate in a closed position and in first and second open positions.

In the illustrated embodiment, the heave plate is discussed in operation in relation to the converter of FIGS. 1 and 2. It will be understood that this is merely an example possible use of the heave plate described herein. Heave plates are generally known for a wide range of applications where it might be desirable to modify the hydrodynamic behaviour of a submerged, partly submerged or floating structure. The embodiment of heave plate presented by way of example is particularly suited to but not limited to a function as a submerged element in a converter such as that described in FIGS. 1 and 2. The embodiment of heave plate might be considered for application in any scenario where a heave plate might be used to modify the hydrodynamic behaviour of a submerged, partly submerged or floating structure.

A second aspect of the invention as above described constitutes a heave plate for such general application. The embodiment presented in FIGS. 10 to 15 herein accordingly additionally serves as an embodiment of such second aspect of the invention.

In the embodiment illustrated in FIGS. 10 to 15, an open frame heave plate structure is defined primarily by a perimeter frame 51. In the embodiment, the perimeter frame 51 defining the perimeter shape of the heave plate is a regular hexagon. Other perimeter shapes would readily suggest themselves to the skilled person. A perimeter shape displaying rotational symmetry, for example comprising a circle or regular polygon, is likely to be preferred.

Each straight edge of the hexagonal perimeter frame 51 has an associated triangular plate element 53 mounted via an arrangement of perimeter hinges 55.

Figure 10:
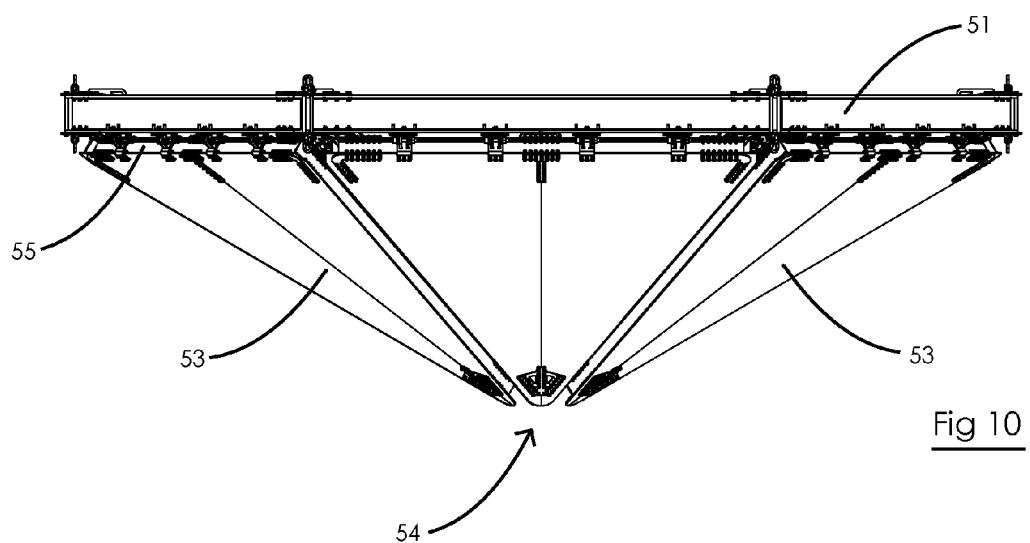
FIG. 10 is a side view of a heave plate suitable for use with the embodiment shown in FIG. 2 in an at rest configuration.

In an at rest configuration, in the absence of a hydrodynamic loading on the heave plate such as likely caused by movement in one or other direction, and such as is shown in FIG. 10, the plate elements 53 sit together to define a closed structure meeting at an apex 54. The plate elements 53 thereby constitute a hexagonally pyramidal surface which has a downwardly directed apex 54 in use, presenting a convex downward surface and a concave upward surface as it sits in the water when deployed.

Although each plate element 53 is presented as a planar triangular structure in the embodiment, defining a pyramidal structure when closed, the invention encompasses other shapes which meet the requirement of closing to form a generally convex closed lower surface, including in particular where applicable closed structures which form a curved surface.

The plate elements 53 are articulated so that they are able to function as closure flaps which can move from the closed position represented in FIG. 10 to one of two alternative open positions represented in FIGS. 11 to 15, respectively under the action of a hydrodynamic pressure acting in a first direction D downwardly in use and corresponding to an upward motion of the heave plate in use, and under the action of a hydrodynamic pressure acting in a second direction U upwardly in use and corresponding to a downward motion of the heave plate in use.

Figure 11:
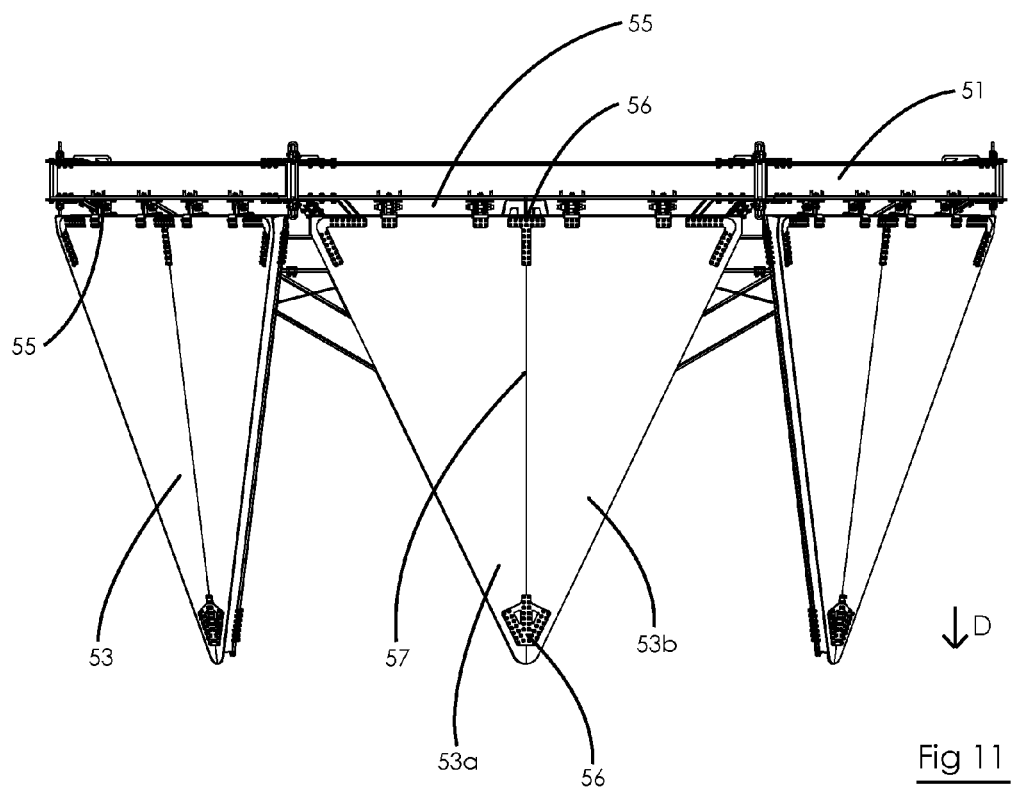
FIG. 11 is a side view of the heave plate in a first open configuration.
Figure 12:
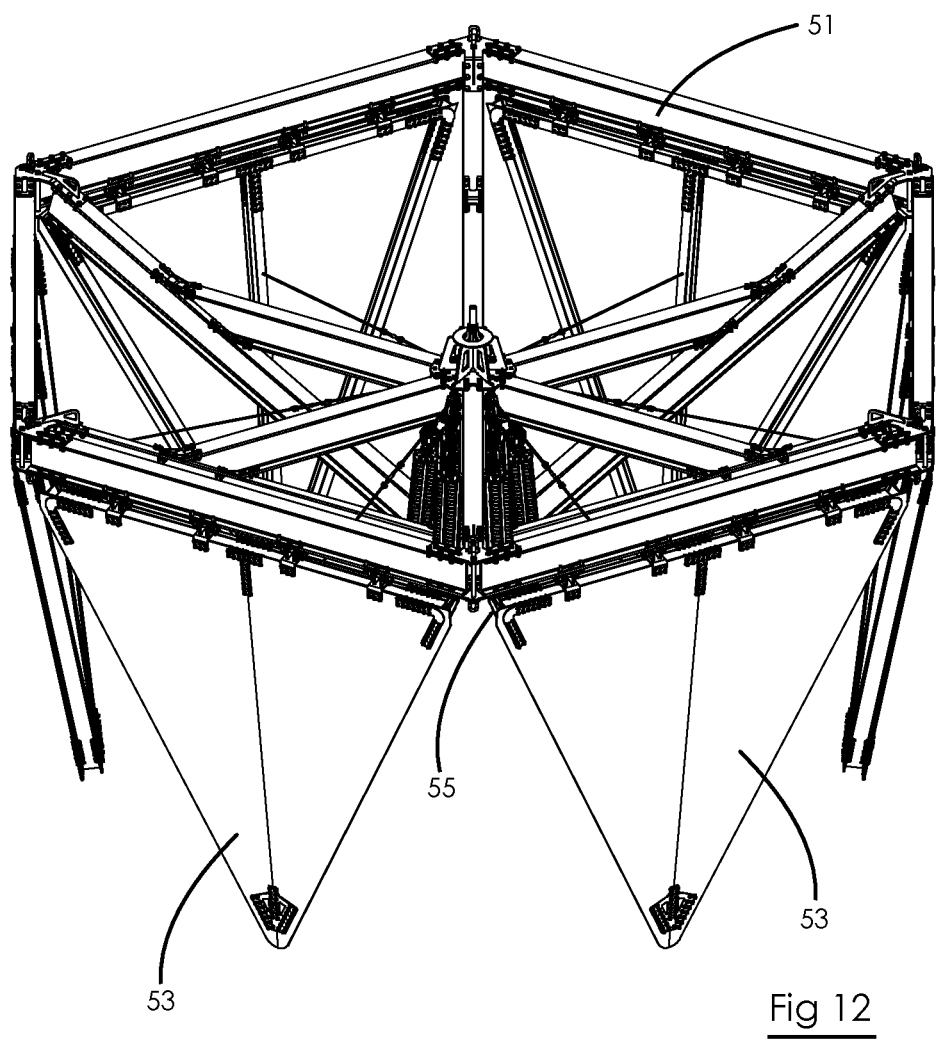
FIG. 12 is a perspective view of the heave plate in a first open configuration.

A first opening mode is illustrated with particular reference to FIGS. 11 and 12. In accordance with a first opening mode the plate elements 53 are articulated to move under a hydrodynamic pressure acting downwardly in use in the direction D to allow rapid upward movement of the heave plate. The plate elements 53 are enabled to act as openable closure flaps by means of a perimeter hinge mounting via the hinge arrangement 55. The hinge arrangement 55 is spring biased to a closed position, but such that as the hydrodynamic pressure in the direction D increases, the flaps defined by the plate elements 53 open in the manner illustrated in FIGS. 11 and 12, the hydrodynamic resistance of the heave plate is dramatically reduced, and the heave plate is able to move rapidly upward as necessary.

Figure 13:
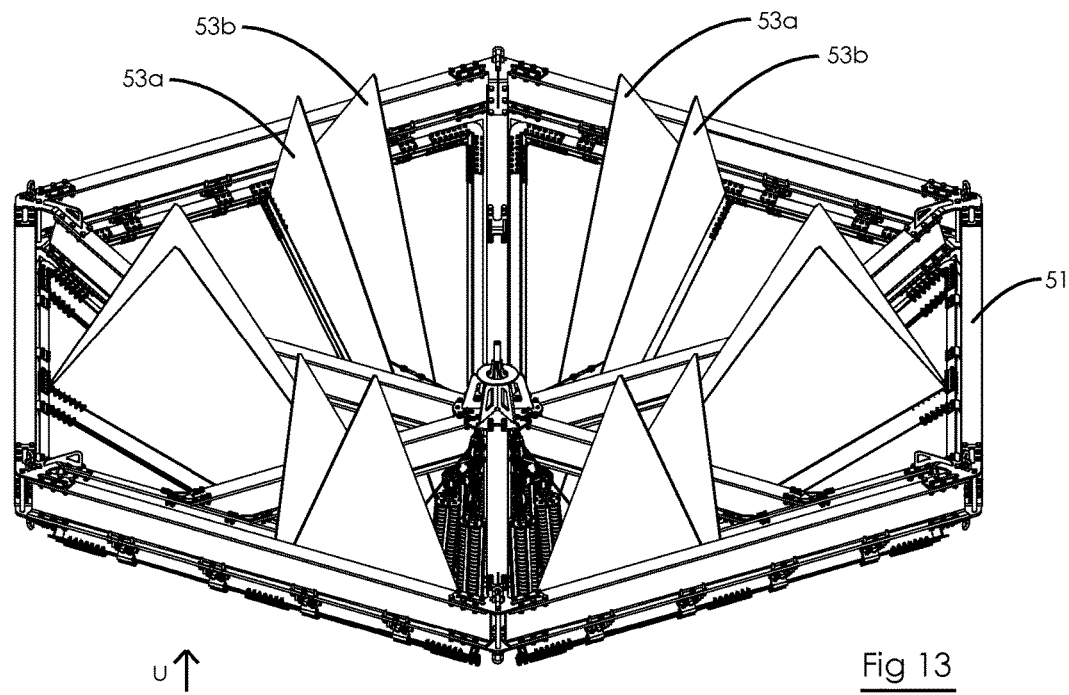
FIG. 13 is a perspective view of the heave plate in a second open configuration.
Figure 14:
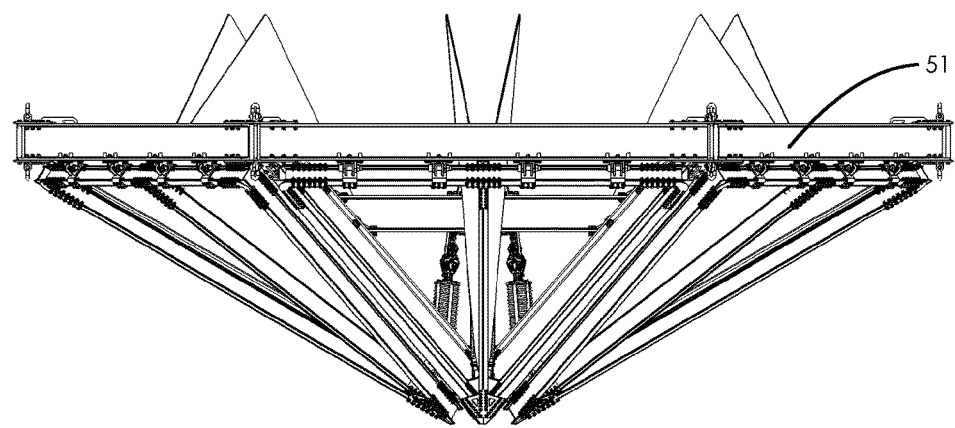
FIG. 14 is a side view of the heave plate in a second open configuration.
Figure 15:
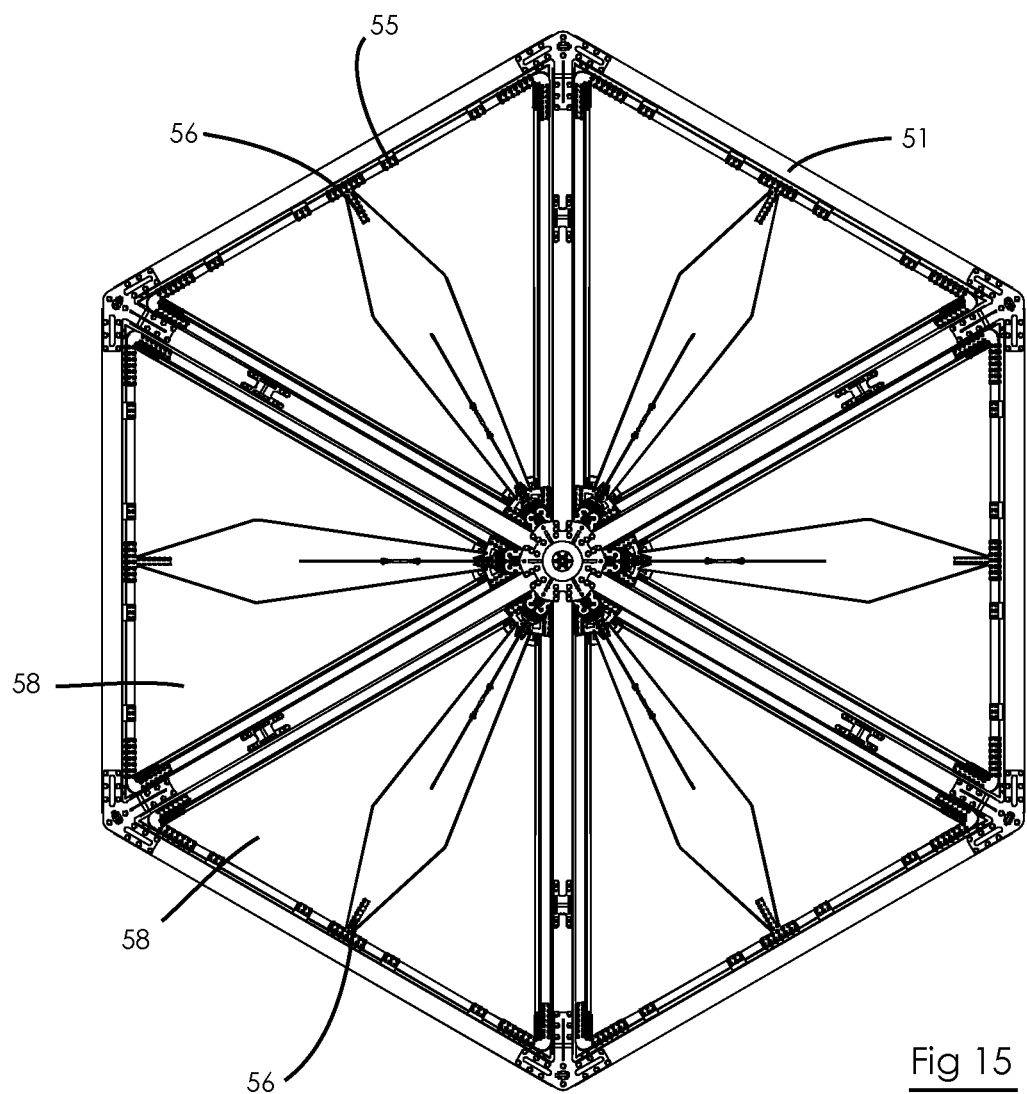
FIG. 15 is a plan view of the heave plate in a second open configuration.

A second opening mode is illustrated with reference to FIGS. 13 to 15. In this opening mode, the plate elements 53 are again configured to act as closure flaps which articulate to an open position under a hydrodynamic pressure this time acting in a second direction, U, which corresponds to an upward hydrodynamic pressure associated with a downward movement of the heave plate in use.

In accordance with this mode of operation, the plate elements 53 have been formed to have two respective plate portions 53a, 53b which are configured to be foldable about a midline 57 by the provision of hinge arrangements 56.

Under action of hydrodynamic pressure in the direction U the hinge arrangements 55 are stopped from acting in an upward direction, and instead the respective plate portions 53a, 53b of each plate element fold about their midlines 57 by agency of the hinge arrangements 56. The plate elements thereby move to a second, upward open position represented in FIGS. 13 to 15. Apertures 58 in the heave plate are thereby opened, reducing the damping effect of the heave plate in respect of its downward motion, so as to allow movement in a downward direction.

In the context of the first aspect of the invention, the purpose of the heave plate is in particular to damp the downward motion so that the heave plate is able to move downwardly but more slowly than and out of phase with the submerged structure. The opening function illustrated in FIGS. 13 to 15 allows the heave plate of the embodiment to perform this function in admirable manner. The opening function disclosed in FIGS. 11 to 12 is more specifically adapted to allow the heave plate to move rapidly upwards.

Each of the hinge arrangements 55, 56 is spring biased to a closed position. A particular feature of the heave plate is that this spring biasing can be pre-set to a different level. Thus, the hydrodynamic pressure required to cause the plates 53 to move to the open configuration in the respective first and second modes of operation may be different. Appropriate selection of a relatively low closing biasing force of the hinge arrangement 55 in relation to the first mode of operation enables the plates 53 to burst open easily to allow rapid upward movement of the heave plate when necessary. Appropriate selection of the biasing force of the hinge arrangement 56 in relation to the second mode of operation allows control of the damping effect achieved by the heave plate in relation to downward motion of the heave plate, and in the context of the first aspect of the invention, controls the way that it moves relative to the buoyant structure.

Thus, in accordance with the illustrated embodiment, a heave plate is provided in which, by suitable arrangement of hinges, closure flaps are provided which are adapted to open in either direction at different pre-set hydrodynamic pressures.

What is claimed is:

1. A wave energy converter comprising:
   a buoyant structure which, in use, floats on water;
   a generator;
   a generator drive mechanism on board the buoyant structure, the generator drive mechanism having a rotational input drive shaft and a rotational output drive shaft;
   a drive member operably connected to the input drive shaft, the drive member being moveable back and forth between a first position and a second position;
   a biasing arrangement acting on the drive member;
   a submerged element which, in use, moves below a surface of the water out of phase with the buoyant structure, the drive member being attached by a tether to the submerged element;
   wherein, in use, when the buoyant structure encounters a wave crest, a spacing between the buoyant structure and the submerged element increases and the drive member is pulled towards the second position by the tether, and, when the buoyant structure encounters a wave trough, the spacing between the buoyant structure and the submerged element decreases and the drive member is urged towards the first position by the biasing arrangement;
   wherein the back and forth movement of the drive member between the first and second positions causes the input drive shaft to rotate and, thereby, causes the output drive shaft to rotate,
   wherein the submerged element is a heave plate having a first hydrodynamic surface and a second hydrodynamic surface,
   wherein the first and second hydrodynamic surfaces are correspondingly concave and convex surfaces formed by opposed surfaces of a plate formation, and the plate formation comprises a plurality of plate elements, at least some of which are configured as selectively openable closure flaps, which serve in an open position to open an apertured portion within the plate formation and serve in a closed position at least substantially to occlude the said apertured portion in the plate formation,
   wherein the plate formation comprises a perimeter frame structure from which a plurality of generally triangular articulating closure flaps extend together to define a complete plate formation having a concave first and convex second surface with the respective triangular articulating closure flaps meeting at an apex, and
   wherein each triangular articulating closure flap is hinged by a first hinge arrangement to deploy in a first direction from a closed position to a first open position when hydrodynamic pressure acts in a first direction, and via a second hinge arrangement to deploy in a second direction from a closed position to a second open position when hydrodynamic pressure acts in a second direction.

2. The converter as claimed in claim 1, wherein the drive member is an elongate member which has one end fastened to the input drive shaft so that the elongate member is pivotably moveable between the first and second positions around an axis which is, or is parallel to, a rotational axis of the input drive shaft, and the tether is attached at or near another end of the elongate member.

3. The converter as claimed in claim 2, wherein the elongate member is an elongate arm extending from a first end about which the elongate member is pivotable around the said axis so that a second end of the elongate arm distal from the first end is movable between the first and second positions as the first end pivots around the said axis.

4. The converter as claimed in claim 1, wherein the drive member is tethered to the submerged element configured such as to move in use but out of phase with the buoyant structure floating on the surface of the water, but is not provided with a further tether or anchor to be anchored in use to an anchoring point that is fixed relative to a bed of a body of water on which the buoyant structure is to be deployed.

5. The converter as claimed in claim 1, wherein the submerged element is a hydrodynamic damper configured to act with the buoyant structure to damp its response to a surface peak or trough in use.

6. The converter as claimed in claim 1, wherein the first and the second hydrodynamic surface are respectively configured to damp the motion of the submerged structure in respective opposite first and second directions.

7. The converter as claimed in claim 1, wherein the plate formation has a generally right circular conical shape or a regular polyhedral pyramidal shape with a downwardly directed apex.

8. The converter as claimed in claim 1, wherein the plate elements of the plurality of plate elements are of congruent shape.

9. The converter as claimed in claim 1, wherein, in the open position of the selectively openable closure flaps, a flow of water through the aperture is freely permitted and in the closed position the flow of water through the aperture is substantially occluded.

10. The converter as claimed in claim 9, wherein each openable closure flap is biased towards the closed position.

11. The converter as claimed in claim 1, comprising a single set of openable closures configured to open in either of the said first and second opening modes dependent upon the direction of motion of the submerged element in use.

12. The converter as claimed in claim 1, further comprising an anchor and an anchor line, wherein the buoyant structure is attached to the anchor by the anchor line.

13. The converter as claimed in claim 12, wherein the buoyant structure is attached directly to the anchor by the anchor line.

14. The converter as claimed in claim 1, wherein the tether comprises a rigid section at an end attached to the drive member.

15. The converter as claimed in claim 1, further comprising at least one ballast tank, wherein filling each ballast tank with water reduces the buoyancy of the buoyant structure.

16. The converter as claimed in claim 1, wherein the biasing arrangement comprises a spring such as a coil spring, a compression spring or an extension spring.

17. The converter as claimed in claim 1, wherein the biasing arrangement comprises a buoyant block.

18. The converter as claimed in claim 1, wherein the generator drive mechanism comprises at least one clutch such that only rotation of the input drive shaft in one direction is transmitted to the output drive shaft.

19. The converter as claimed in claim 1, comprising multiple generators, each generator having a generator drive mechanism, each drive mechanism having an input drive shaft, and a drive member operably connected to each input drive shaft and each drive member attached to the submerged element by a tether.

20. The converter as claimed in claim 1, wherein the buoyant structure comprises an access hatch.

21. The converter as claimed in claim 1, wherein the converter is configured to convert wave energy to electrical energy.

22. The converter as claimed in claim 1, wherein the heave plate is for a submerged, partly submerged, or floating structure.

23. A heave plate for a submerged, partly submerged, or floating structure comprising a first and a second hydrodynamic surface respectively configured to damp motion of the submerged structure in respective opposite first and second directions,
wherein the first and second hydrodynamic surfaces are correspondingly concave and convex surfaces formed by opposed surfaces of a plate formation, and the plate formation comprises a plurality of plate elements, at least some of which are configured as selectively openable closure flaps, which serve in an open position to open an apertured portion within the plate formation and serve in a closed position at least substantially to occlude the said apertured portion in the plate formation,
wherein the plate formation comprises a perimeter frame structure from which a plurality of generally triangular articulating closure flaps extend together to define a complete plate formation having a concave first and convex second surface with the respective triangular articulating closure flaps meeting at an apex, and
wherein each triangular articulating closure flap is hinged by a first hinge arrangement to deploy in a first direction from a closed position to a first open position when hydrodynamic pressure acts in a first direction, and via a second hinge arrangement to deploy in a second direction from a closed position to a second open position when hydrodynamic pressure acts in a second direction.

24. The heave plate as claimed in claim 23, wherein each triangular articulating closure flap is hingedly mounted to a corresponding portion of a perimeter frame to be deployable in the first direction to the first open position under the action of hydrodynamic pressure in the first direction.

25. The heave plate as claimed in claim 23, wherein first and second portions of each triangular articulating closure flap are hingedly articulated together whereby the first and second portions of the said flaps are foldable under the action of hydrodynamic pressure in the second direction.

26. A hydrodynamically modified structural assembly comprising a primary structural module which comprises in use a submerged, partly submerged or floating structure, tethered to a submerged structure comprising a heave plate in accordance with claim 23.

* * * * *